United States Patent
Matsumoto et al.

(10) Patent No.: US 9,186,754 B2
(45) Date of Patent: Nov. 17, 2015

(54) FLUX-CORED WIRE FOR WELDING DIFFERENT MATERIALS, METHOD FOR LASER WELDING OF DIFFERENT MATERIALS, AND METHOD FOR MIG WELDING OF DIFFERENT MATERIALS

(75) Inventors: Tsuyoshi Matsumoto, Fujisawa (JP); Seiji Sasabe, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 896 days.

(21) Appl. No.: 13/388,177

(22) PCT Filed: Jul. 26, 2010

(86) PCT No.: PCT/JP2010/062526
§ 371 (c)(1),
(2), (4) Date: Jan. 31, 2012

(87) PCT Pub. No.: WO2011/013620
PCT Pub. Date: Feb. 3, 2011

(65) Prior Publication Data
US 2012/0125900 A1 May 24, 2012

(30) Foreign Application Priority Data
Jul. 31, 2009 (JP) .................................. 2009-179514

(51) Int. Cl.
*B23K 35/36* (2006.01)
*B23K 35/368* (2006.01)
(Continued)

(52) U.S. Cl.
CPC ............... *B23K 35/286* (2013.01); *B23K 9/173* (2013.01); *B23K 9/232* (2013.01); *B23K 26/203* (2013.01);
(Continued)

(58) Field of Classification Search
CPC .......... B23K 9/16; B23K 9/173; B23K 9/232; B23K 26/203; B23K 35/28; B23K 35/36; B23K 35/368
USPC ........ 75/302; 219/137 R, 121.64, 74, 137 PS, 219/137 WM, 145.22, 121.84; 148/23; 228/262.44
See application file for complete search history.

(56) References Cited

U.S. PATENT DOCUMENTS 2,043,855 A * 6/1936 Keller ............................ 420/548
3,177,340 A * 4/1965 Georges .................... 219/146.52
(Continued)

FOREIGN PATENT DOCUMENTS

CN 101219508 A * 7/2008
CN 101351298 A 1/2009
(Continued)

OTHER PUBLICATIONS

Composition Spec for Aluminum A6000, http://www.matweb.com/search/datasheet.aspx?matguid=baf6485b761d44d8a8fcefbfb4104425&ckck=1.*
(Continued)

*Primary Examiner* — Samuel M Heinrich
(74) *Attorney, Agent, or Firm* — Oblon, McClelland, Maier & Neustadt, L.L.P.

(57) ABSTRACT

A flux-cored wire for laser welding or MIG welding different materials, wherein the different materials are aluminum or an aluminum alloy material and a galvanized steel material. The flux-cored wire contains a cylindrical aluminum alloy sheath containing: aluminum, 0.8-1.9 mass % Si, at most 0.1 mass % Mn, 0.1 mass % Mg, and 0.1 mass % Fe; and a flux filled in a space within the sheath and containing 20-60 mass % cesium fluoride, wherein the percentage filling of the flux is 5-20 mass % with respect to the total mass of the flux-core wire.

20 Claims, 3 Drawing Sheets (51) Int. Cl.
- B23K 9/23 (2006.01)
- B23K 35/28 (2006.01)
- B23K 9/173 (2006.01)
- B23K 26/20 (2014.01)
- C22C 21/02 (2006.01)
- B23K 35/02 (2006.01)

(52) U.S. Cl.
CPC ............ *B23K 35/0266* (2013.01); *B23K 35/36* (2013.01); *B23K 35/3605* (2013.01); *B23K 35/368* (2013.01); *C22C 21/02* (2013.01); *B23K 2203/20* (2013.01)

(56) References Cited

U.S. PATENT DOCUMENTS

| | | | |
|---|---|---|---|
| 3,544,761 A * | 12/1970 | Rosenberg | 219/137 R |
| 3,866,015 A * | 2/1975 | Matsumoto et al. | 219/146.52 |
| 4,186,293 A * | 1/1980 | Gonzalez et al. | 219/146.24 |
| 4,689,092 A * | 8/1987 | Suzuki et al. | 148/26 |
| 5,171,377 A * | 12/1992 | Shimizu et al. | 148/23 |
| 5,418,072 A * | 5/1995 | Baldantoni et al. | 428/558 |
| 6,474,397 B1 * | 11/2002 | Gunkel et al. | 164/102 |
| 7,473,864 B2 | 1/2009 | Iwase et al. | |
| 7,800,011 B2 * | 9/2010 | Fukuda et al. | 219/74 |
| 8,742,294 B2 * | 6/2014 | Fukuda et al. | 219/136 |
| 8,907,246 B2 * | 12/2014 | Sasabe et al. | 219/121.64 |
| 2009/0017328 A1 | 1/2009 | Katoh et al. | |
| 2011/0097594 A1 | 4/2011 | Tanaka et al. | |
| 2012/0074111 A1 | 3/2012 | Sasabe et al. | |

FOREIGN PATENT DOCUMENTS

| | | |
|---|---|---|
| CN | 101378873 A | 3/2009 |
| EP | 1 980 357 A1 | 10/2008 |
| EP | 1 997 579 A1 | 12/2008 |
| JP | 2003 211270 | 7/2003 |
| JP | 2006 224145 | 8/2006 |
| JP | 2007 136524 | 6/2007 |
| JP | 2008 68290 | 3/2008 |
| WO | WO 2007/058257 A1 | 5/2007 |
| WO | WO 2007/094203 A1 | 8/2007 |

OTHER PUBLICATIONS

International Search Report Issued Oct. 26, 2010 in PCT/JP10/62526 Filed Jul. 26, 2010.

Supplementary European Search Report issued Jul. 2, 2015 in European Patent Application No. 10804366.2, filed Jul. 26, 2010.

* cited by examiner

FLUX-CORED WIRE FOR WELDING DIFFERENT MATERIALS, METHOD FOR LASER WELDING OF DIFFERENT MATERIALS, AND METHOD FOR MIG WELDING OF DIFFERENT MATERIALS

TECHNICAL FIELD

The present invention relates to a flux-cored wire for welding different materials for use in welding different materials such as automobiles and like transport machinery, and components for building materials, a method for laser welding of different materials using this flux-cored wire for welding different materials and a method for MIG welding of different materials, and especially to a flux-cored wire for welding different materials which is suitable for use in welding aluminum or an aluminum alloy material and a galvanized steel plate and a method for laser welding of different materials and a method for MIG welding of different materials.

BACKGROUND ART

Conventionally, steel materials are used as materials for vehicle bodies and the like in transport machinery such as automobiles. Steel materials used as components of transport machinery and the like are exposed to rain water and the like when used. Therefore, their surfaces are treated with antirust galvanizing. This provides waterproof effect by an oxide film formed on the galvanized surface, and also allows zinc to be preferentially corroded over iron (sacrificial protection) even when there are flaws or pin holes on the surface of the steel material.

Recently, hybrid automobiles, electric vehicles and the like have been rapidly studied and developed from the perspective of environmental protection, and weight reduction of vehicle bodies and other components of these automobiles has been required to improve fuel efficiency and for other purposes. Moreover, in order to achieve weight reduction of vehicle bodies and other components, constituting a portion of a steel material used as a material of such components by aluminum or an aluminum alloy material (hereinafter, aluminum materials and aluminum alloy materials are collectively referred to as aluminum alloy materials) has been examined.

Therefore, to produce vehicle bodies and other components, a steel material and an aluminum alloy material need to be welded by different-material bonding. Examples of techniques of different-material bonding of a steel material and an aluminum alloy material include a method of bonding base materials by MIG welding or laser arc welding while feeding a flux-cored wire (patent document 1).

MIG (Metal Inert gas) welding includes feeding an inert gas such as argon or helium as a shielding gas to the vicinity of a site to be bonded, generating an arc between the welding wire and the site, and fuse-bonding the steel material and the aluminum alloy material. This MIG welding is characterized in that the welding operation is performed in a state that the atmospheric air is displaced by the shielding gas, and therefore welding proceeds without any influence of oxygen in the air. In laser welding, in contrast, a joint portion and a welding wire which is being fed to the joint portion are irradiated with laser light to thermally fuse the welding wire and joint portion by the laser light.

[Patent document 1] Japanese Unexamined Patent Publication No. 2003-211270
[Patent document 2] Japanese Unexamined Patent Publication No. 2008-68290

DISCLOSURE OF THE INVENTION

Problems to be Solved by the Invention

However, the aforementioned prior art has the following problems: in the case where a steel material and an aluminum alloy material in a structure such as a vehicle body of an automobile are butt-welded, tensile stress and shear stress act between the base materials when an external force is applied to the welded joint portion. In contrast, when, for example, a steel material and an aluminum alloy material are welded in an overlapped state, tensile stress and shear stress act between the base materials when an external force is applied to the welded joint portion, and peeling stress acts at the weld interface in the direction of peeling the two base materials away from each other. Therefore, when different materials are welded, the welded joint portion needs to have not only tensile shear strength but also, high peeling strength (peel strength). However, conventionally, when a steel material and an aluminum alloy material are bonded by welding, a highly brittle intermetallic compound is produced in a joined part, and the tensile shear strength and peeling strength of the joined part may be disadvantageously lowered than in the case where components of the same type are welded.

Moreover, when different-material laser welding is performed by using the flux-cored wire disclosed in patent document 1, the tenacity near the joined part may be lowered depending on its composition and peeling strength may be lowered in some cases.

The inventors of the present application have suggested a flux-cored wire used in MIG welding or laser arc welding of a steel material and an aluminum alloy material and a different-material bonding method in cited document 2. However, the flux-cored wire disclosed in cited document 2 may also have lowered peeling strength in a joined part depending on its composition.

The present invention has been made in view of such problems, and its object is to provide a flux-cored wire for welding different materials which can improve the tensile shear strength of the welded joint portion and the peeling strength at a weld interface when aluminum or an aluminum alloy material and a galvanized steel material are welded, a method for laser welding of different materials and a method for MIG welding of different materials.

Means for Solving the Problems

The flux-cored wire for welding different materials according to the present invention is flux-cored wire for welding different materials for use in different-material welding of aluminum or an aluminum alloy material and a galvanized steel material, the wire having: a cylindrical sheath made of an aluminum alloy containing Si in an amount of 0.8 to 1.9% by mass, with the remainder being aluminum and inevitable impurities, and a flux filling this sheath and containing cesium fluoride in an amount of 20 to 60% by mass, inevitable impurities in the sheath being Mn, Mg or Fe, the amounts of Mn, Mg and Fe contained being 0.10% by mass or lower of the total mass of the sheath, respectively, and a percentage filling of the flux being 5 to 20% by mass of the total mass of the wire.

The amount of Si contained in the aluminum alloy constituting the above-mentioned sheath is preferably 0.8 to 1.4% by mass.

The method for laser welding of different materials according to the present invention includes using the flux-cored wire for welding different materials stated above, constituting a joint portion by aluminum or an aluminum alloy material and a galvanized steel material, and feeding the flux-cored wire for welding different materials to this joint portion and irradiating the joint portion with laser light at the same time to bond the aluminum or aluminum alloy material and the galvanized steel material.

In this case, for example, the aluminum or aluminum alloy material and galvanized steel material are disposed to overlap with each other so that the aluminum or aluminum alloy material is on the laser light side, and the aluminum or aluminum alloy material and galvanized steel material are lap-welded.

The aluminum or aluminum alloy material and the galvanized steel material disposed in abutment with each other may be also butt-welded with the feeding position of the flux-cored wire for welding different materials and the irradiation position of the laser light shifted closer to the aluminum or aluminum alloy material side than to the abutment portion.

The method for MIG welding of different materials according to the present invention includes using the above flux-cored wire for welding different materials, constituting a joint portion by aluminum or an aluminum alloy material and a galvanized steel material, forming an arc between the joint portion and the flux-cored wire for welding different materials, and feeding an inert gas to the vicinity of the arc and bonding the aluminum or aluminum alloy material and the galvanized steel material at the same time.

In this method for MIG welding of different materials, it is preferable to dispose the aluminum or aluminum alloy material and galvanized steel material to overlap with each other so that the aluminum or aluminum alloy material is on the side of the flux-cored wire for welding different materials, and lap-weld the aluminum or aluminum alloy material and the galvanized steel material.

Effect of the Invention

In the flux-cored wire for welding different materials of the present invention, the amounts of cesium fluoride in the flux and Si in the sheath are appropriately defined. Therefore, the wire, if used in different-material laser welding or different-material MIG welding of aluminum or an aluminum alloy material and a galvanized steel material, is capable of improving the tensile shear strength of the welded joint portion and the peeling strength at the weld interface.

In addition, the percentage filling of the flux is appropriately defined. Therefore, the reducing effect by the flux can be effectively obtained, and the tensile shear strength of the welded joint portion and the peeling strength at the weld interface can be improved more effectively. The reducing effect by the flux is supposedly as follows: in different-material laser welding or different-material MIG welding of aluminum or an aluminum alloy material and a galvanized steel material, an oxide film on the surface of aluminum and a galvanized layer and an oxide film on the surface of the galvanized steel material are more easily reduced and removed by activation of the flux by welding heat. By removing a plated layer and a surface oxide film in base materials to be bonded in different-material laser welding or different-material MIG welding in such a manner, a newly generated interface of a metal appears on the outermost layers of the respective base materials. Therefore, the base materials are strongly bonded to each other, and the tensile shear strength and peeling strength of the welded joint portion are improved.

According to the different-material laser welding or different-material MIG welding of the present invention, the tensile shear strength of the welded joint portion and the peeling strength at the weld interface in different-material bonding of aluminum or an aluminum alloy material and a galvanized steel material can be improved.

BRIEF DESCRIPTION OF THE DRAWINGS

FIGS. 5 (*a*) to (*d*) are drawings which show Examples of the flux-cored wire for welding different materials.

BEST MODE FOR CARRYING OUT THE INVENTION

Figure 1:
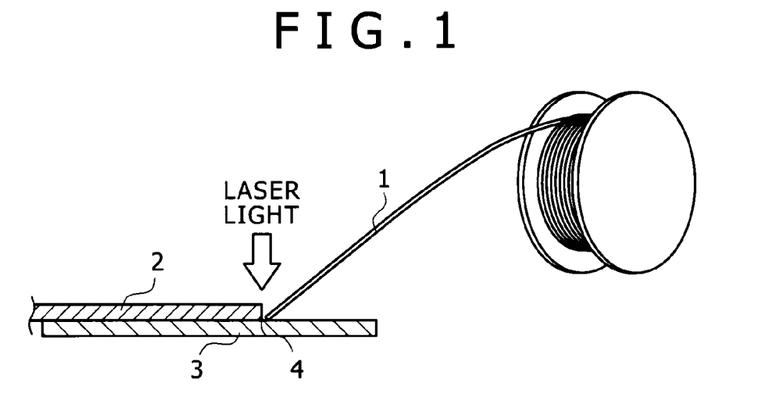
FIG. 1 is a schematic diagram showing lap welding by the method for laser welding of different materials of the present invention.
Figure 2:
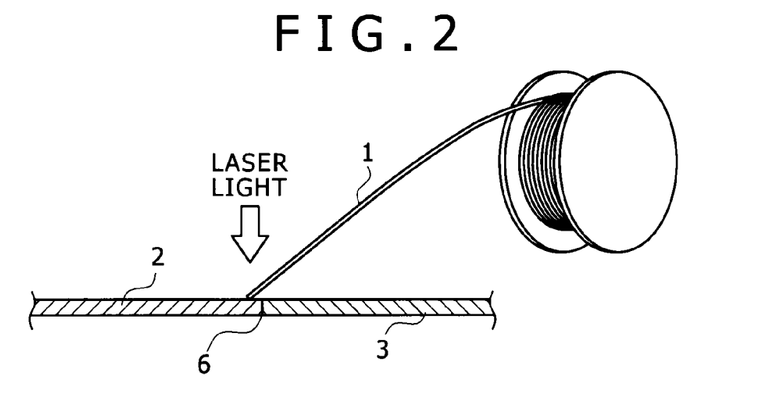
FIG. 2 is a schematic diagram showing butt welding by the method for laser welding of different materials of the present invention.
Figure 5:
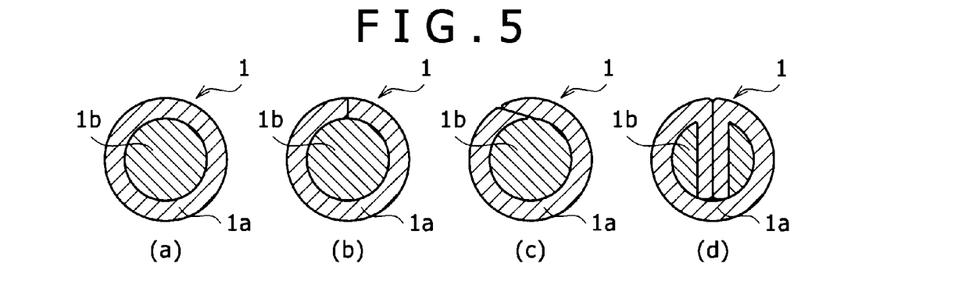

Embodiments of the present invention will be described below in detail. FIG. 1 is a schematic diagram showing lap welding by the method for laser welding of different materials of the present invention; FIG. 2 is a schematic diagram showing butt welding by the method for laser welding of different materials of the present invention; and FIG. 5 are drawings which show Examples of the flux-cored wire for welding different materials. When lap welding is performed by the method for laser welding of different materials of the present invention, as shown in FIG. 1, for example, the aluminum alloy material 2 is disposed on the laser light side, and the plate-like aluminum alloy material 2 and the galvanized steel material 3 are disposed to overlap with each other. The lapped portion 4 of the aluminum alloy material 2 and the galvanized steel material 3 are then laser-welded by irradiating the portion with laser light while feeding the flux-cored wire 1 for welding different materials thereto, bonding the aluminum alloy material 2 and the galvanized steel material 3. When butt welding is performed by the method for laser welding of different materials of the present invention, as shown in FIG. 2, the plate-like aluminum alloy material 2 and the galvanized steel material 3 are disposed in abutment with each other, and laser welding is performed by irradiating the abutment portion with laser light while feeding the flux-cored wire for welding different materials to a portion shifted closer to the aluminum alloy material 2 side than to this abutment portion 6. Usable output devices of the laser light include YAG lasers, $CO_2$ lasers and fiber lasers, among various others.

Examples of materials usable for the aluminum alloy material 2 include JIS A 1000 series, A 2000 series (Al—Cu-based alloy), A 3000 series (Al—Mn-based alloy), A 4000 series (Al—Si-based alloy), A 5000 series (Al—Mg-based alloy), A 6000 series (Al—Mg—Si-based alloy) and A 7000 series (Al—Zn—Mg-based alloy, Al—Zn—Mg—Cu-based alloy). In addition, a plate material having a thickness of, for example, 0.5 to 4.0 mm can be used as the aluminum alloy material 2.

For example, SPCC (cold-rolled low-carbon steel sheet), high tensile strength steel and various other steel materials can be used as the steel material. In the present invention, the steel material has been treated with hot-dip galvanizing and is constituted as the galvanized steel plate 3. An example of the galvanized steel material 3 usable is a plate material having a thickness of 0.5 to 4.0 mm, and the thickness may be different from that of the aluminum alloy material 2.

The flux-cored wire 1 for welding different materials, as shown in, for example, FIG. 5 (a) to (d), a cylindrical sheath 1a made of an aluminum alloy and filled with a flux 1b, and the outer diameter of the wire 1 is, for example, 0.8 to 1.6 mm. In the present invention, the percentage filling of the flux 1b in the wire 1 is 5 to 20% by mass of the total mass of the wire. In addition, the flux 1b of the present invention contains 20 to 60% by mass of cesium fluoride. The aluminum sheath 1a is formed of an aluminum alloy containing 0.8 to 1.9% by mass of Si, with the remainder being aluminum and inevitable impurities. Examples of inevitable impurities in this aluminum sheath 1a include Mg, Mn and Fe, and their amounts contained are 0.1% by mass or lower, respectively, of the total mass of the sheath.

The reasons for limitations of numerical values of the composition of the flux-cored wire for welding different materials of the present invention will be described below.

"Amount of Cesium Fluoride Contained in Flux: 20 to 60% by Mass of Total Mass of Flux"

Cesium fluoride functions to suppress production of a highly brittle intermetallic compound between an aluminum alloy material and a galvanized steel material during laser welding. When the amount of cesium fluoride contained in the flux is lower than 20% by mass, it hardly functions to suppress the production of the highly brittle intermetallic compound, and the tensile shear strength and peeling strength are lowered.

In contrast, when the amount of cesium fluoride contained in the flux is higher than 60% by mass, the improvement in the function in suppressing the production of the highly brittle intermetallic compound is saturated, while the production cost of the flux-cored wire for welding different materials is increased because of an increased amount of costly cesium contained. Therefore, in the present invention, the amount of cesium fluoride contained in the flux is defined to be 20 to 60% by mass of the total mass of the flux. Examples of components contained in the flux other than cesium fluoride include suitable combinations of aluminum fluoride, potassium fluoride, potassium aluminum fluoride and lanthanum fluoride. Aluminum fluoride, potassium fluoride and potassium aluminum fluoride are referred to as potassium aluminum fluoride-based compounds, which are thought to have the following functions: removal of an aluminum oxide film, promotion of fusion of the wire at a low melting point, ensuring wettability, and a barrier for suppressing diffusion at the interface between the steel material and the aluminum material.

"Amount of Si Contained in Aluminum Alloy Constituting Sheath: 0.8 to 1.9% by mass"

Si contained in the aluminum alloy constituting the sheath is a component which is essential to improve the tensile shear strength of the welded joint portion. When the amount of Si contained in the aluminum alloy is lower than 0.8% by mass, the effect in improving the tensile shear strength of the welded joint portion is insufficient. In contrast, when the amount of Si contained in the aluminum alloy is higher than 1.9% by mass, the peeling strength is lowered due to lowered tenacity in the vicinity of the joined part. Therefore, in the present invention, the amount of Si contained in the aluminum alloy constituting the sheath is defined to be 0.8 to 1.9% by mass. In addition, when the amount of Si contained in the aluminum alloy is higher than 1.4% by mass, the tensile shear strength of the welded joint portion starts to lower. Therefore, it is desirable that the amount of Si contained in the aluminum alloy constituting the sheath is 0.8 to 1.4% by mass.

"Amounts of Mn, Mg and Fe Contained in Sheath as Inevitable Impurities: 0.1% by Mass or Lower of Total Mass of Sheath, Respectively"

For example, Mg, Mn and Fe are contained as inevitable impurities in the sheath. These Mg, Mn and Fe lower the effect in improving the tensile shear strength of the welded joint portion by the addition of Si when their amounts contained are excessively high. When any of the amounts of Mg, Mn and Fe contained is higher than 0.1% by mass of the total mass of the sheath, the tensile shear strength of the welded joint portion is lowered. Therefore, the amounts of Mg, Mn and Fe contained in the aluminum alloy constituting the sheath are to be 0.1% by mass or lower of the total mass of the sheath, respectively.

"Percentage Filling of Flux: 5 to 20% by Mass of Total Mass of Wire"

The flux has a reducing effect on the aluminum alloy material and galvanized steel material. When the percentage filling of the flux is lower than 5% by mass of the total mass of the wire, the reducing effect by the flux is lowered, and the tensile shear strength and peeling strength are lowered. In contrast, when the percentage filling of the flux is higher than 20% by mass of the total mass of the wire, and the reducing action excessively increases, whereby the tensile shear strength and peeling strength are lowered on the contrary. Therefore, in the present invention, the percentage filling of the flux is defined to be 5 to 20% by mass of the total mass of the wire.

Next, the method for laser welding of different materials using the flux-cored wire for welding different materials of this embodiment will be described. First, a joint portion is constituted by the aluminum alloy material 2 and the galvanized steel material 3. For example, when the joint portion is formed by lap welding, as shown in FIG. 1, the plate-like aluminum material 2 and the galvanized steel material 3 are overlapped, and for example, the aluminum alloy material 2 is disposed on the laser light side. By disposing the aluminum alloy material 2 on the laser light side in such a manner, the aluminum alloy material 2 having a lower melting point can be fused earlier than the galvanized steel material 3, and then the galvanized steel material 3 disposed below the aluminum alloy material 2 can be partially fused. Therefore, dripping of the molten metal from a molten pool can be prevented more effectively than in the case where lap welding is performed with the galvanized steel material 3 disposed on the laser light side, and the lap welding can be smoothly performed. When the joint portion is butt-welded, as shown in FIG. 2, the aluminum material 2 and the galvanized steel material 3 are abutted.

Next, in the welded joint portion, the focal position of laser light is adjusted under a shielding gas atmosphere such as, for example, helium or argon, and laser light is condensed in the vicinity of the lapped portion 4 or abutment portion 6 of the base materials. The flux-cored wire 1 for welding different materials is then fed to the vicinity of the lapped portion 4 or abutment portion 6 of the base materials. When the aluminum alloy material 2 and the galvanized steel material 3 are lap-welded, the aluminum alloy material 2 is disposed on the laser light side. Therefore, the aluminum alloy material 2 can be actively fused. The galvanized layer and surface oxide film on the surface of the galvanized steel material 3 are then reduced by the flux; the steel interface is brought into contact with in the molten metal of the aluminum alloy; and the aluminum alloy material 2 and the galvanized steel material 3 are bonded by braze welding. The braze welding of the aluminum alloy material 2 and the galvanized steel material 3 means fusing the aluminum alloy material 2 having a low melting point and simultaneously bonding the aluminum alloy with the galvanized steel material 3 using the fused aluminum alloy as a filler material. When the aluminum alloy material and the galvanized steel material are butt-welded, the flux-cored wire 1 for welding different materials is fed to the abutment portion 6, while laser light is irradiated with the focal position adjusted on the abutment portion 6, whereby the aluminum alloy material 2 and the galvanized steel material 3 are bonded by braze welding. This can prevent burn through of the molten metal.

The aluminum alloy material 2 having a lower melting point fuses first by the irradiation of the laser light. The galvanized steel material 3 fuses next, in which the galvanized layer on the steel plate fuses first, and a steel portion is fused in part subsequently. The flux-cored wire 1 for welding different materials fused by the irradiation of the laser light similarly is then fed into these molten metal components.

When the position irradiated with the laser light is moved along the weld line, the fused aluminum alloy components, galvanizing components, steel components and flux-cored wire components are mixed and solidified in such a state behind the irradiation position sequentially along the welding direction to form a bead. At this time, an intermetallic compound is produced between the aluminum alloy material 2 and galvanized steel material 3 to be welded. In the flux-cored wire 1 for welding different materials of this embodiment, the amount of cesium fluoride contained in the flux is defined to be an appropriate value. Therefore, as for the intermetallic compounds produced at the weld, for example, FeAl, $Fe_3Al$ or the like, which does not lower brittleness, is generated in an amount greater than $FeAl_3$, $Fe_2Al_5$ or the like, which is more brittle. Therefore, the tensile shear strength and peeling strength of the welded joint portion can be improved.

In addition, in the flux-cored wire 1 for welding different materials, the amount of Si contained in the aluminum sheath 1a is defined to fall within an appropriate range, and therefore the tensile shear strength can be improved without lowering the peeling strength of the welded joint portion. In this case, limiting the amounts of Mg, Mn and Fe contained in the aluminum sheath 1a to 0.1% by mass or lower of the total mass of the sheath 1a, respectively, can improve the tensile shear strength by the addition of Si more effectively.

Furthermore, in the flux-cored wire 1 for welding different materials of this embodiment, the percentage filling of the flux 1b is defined to fall within an appropriate range. Therefore, the reducing action of the flux can be effectively obtained without lowering the tensile shear strength and peeling strength.

In this embodiment, as already mentioned, when the aluminum alloy material 2 and the galvanized steel material 3 are lap-welded, it is desirable that the aluminum alloy material 2 is disposed on the laser light side. However, in the present invention, the irradiation position of the laser light and the feeding position of the flux-cored wire 1 are not limited as long as the base materials can be fused to each other and an appropriate amount of the fused flux-cored wire 1 can be fed into the molten pool of the molten metal.

Figure 3:
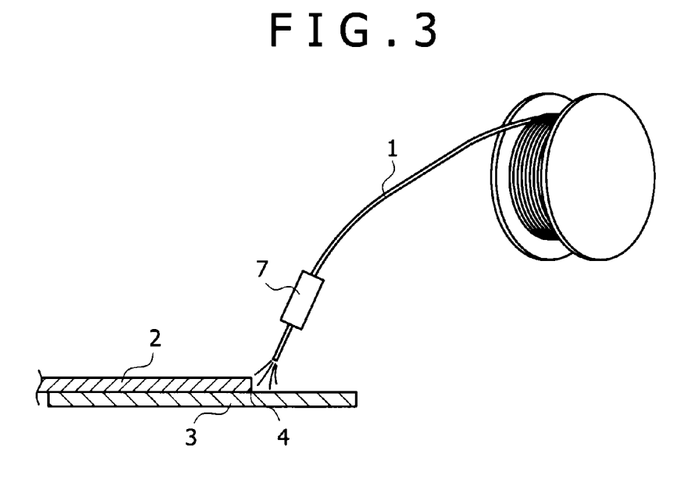
FIG. 3 is a schematic diagram showing lap welding by the method for MIG welding of different materials of the present invention.

Next, an embodiment of the method for MIG welding of different materials according to the present invention will be described. A welding wire used in MIG welding is the same as the welding wire 1 used in the method for laser welding of different materials. In addition, conditions for MIG welding and the like are the same as in normal MIG welding. FIG. 3 is a schematic diagram showing the welding method in the case of lap welding. First, a joint portion is constituted by the aluminum alloy material 2 and the galvanized steel material 3. When the joint portion is lap-welded, as shown in FIG. 3, the plate-like aluminum material 2 and the galvanized steel material 3 are overlapped, and for example, the aluminum alloy material 2 is disposed on the side of a torch 7. By disposing the aluminum alloy material 2 on the torch 7 side in such a manner, the aluminum alloy material 2 having a lower melting point can be fused earlier than the galvanized steel material 3, and then the galvanized steel material 3 disposed below the aluminum alloy material 2 can be partially fused. Therefore, dripping of the molten metal from the molten pool can be prevent more effectively than in the case where lap welding is performed with the galvanized steel material 3 disposed on the torch 7 side, and lap welding can be smoothly performed.

Figure 4:
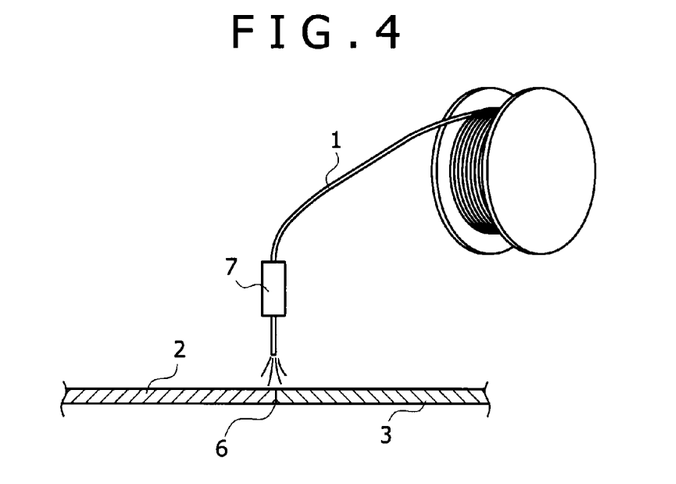
FIG. 4 is a schematic diagram showing butt welding by the method for MIG welding of different materials of the present invention.

When the joint portion is butt-welded, as shown in FIG. 4, the aluminum material 2 and the galvanized steel material 3 are abutted. In both cases of FIG. 3 and FIG. 4, oxygen in the air is kept from entering the molten pool by feeding an inert gas such as an argon gas or a helium gas to the vicinity of the welding wire 1 fed from the torch 7 to the joint portion and the molten pool, and oxidation of the molten metal is suppressed.

This method for MIG welding of different materials using the flux-cored wire for welding different materials of the present invention also produces the same effects as the method for laser welding of different materials using flux-cored wire for welding different materials of the present invention.

First Example

Examples which show the effects of the flux-cored wire for welding different materials of the present invention will be specifically described below in comparison with their Comparative Examples. A plate material (for example, width: 100 mm, length: 300 mm) having a plate thickness of 1.0 mm made of AA6022 alloy (JIS A 6000 series alloy) was used as the aluminum alloy material 2. In addition, a 980 MPa grade cold-rolled steel plate having a plate thickness of 1.2 mm (for example, width: 100 mm, length: 300 mm) was subjected to hot-dip galvanizing, giving a galvanized steel material 3. Sample materials to be welded used were unprocessed plate materials of the aluminum alloy material 2 and the galvanized steel material 3, and bent plate materials which were bent 90 degrees in positions spaced from the edges of the respective plate materials by appropriate lengths (aluminum alloy material 2: 10 mm from the edge of the plate material, galvanized steel material 3: 60 mm from the edge of the plate material) were used.

These aluminum alloy material 2 and galvanized steel material 3 were then overlapped. As shown in FIG. 1, the aluminum alloy material 2 was disposed on the laser light side, and the lapped portion 4 was surrounded by a shielding gas atmosphere. An argon gas was used as a shielding gas. The lapped portion 4 was irradiated with laser light while the respective flux-cored wire for welding different materials (diameter: 1.2 mm) of Examples and Comparative Examples were fed to the lapped portion 4, performing lap laser welding. The laser used to irradiate the lapped portion 4 was continuous-wave YAG (Yttrium-Aluminum Garnet) laser (laser output: 4.0 kW), and the welding speed was 1.2 m/min.

Figure 6:
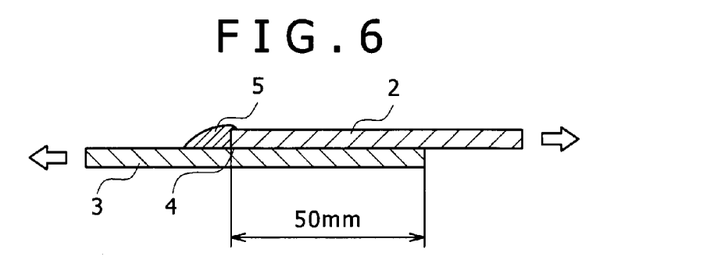
FIG. 6 is a drawing which shows a tensile shear strength test of a joint portion according to an embodiment of the present invention.
Figure 7:
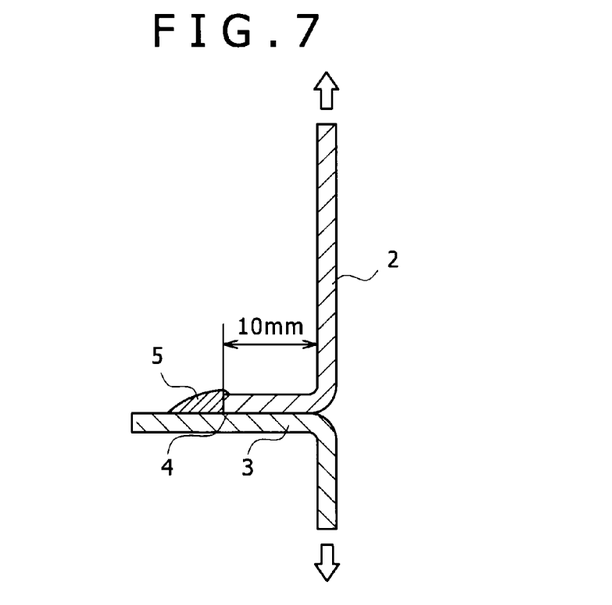
FIG. 7 is a drawing which shows a peeling strength test of a weld interface according to an embodiment of the present invention.

When plate materials were used as components to be welded, they were disposed so that the length of the lapped portion 4 of the components was 50 mm as shown in FIG. 6. In addition, when bent plate materials were used as components to be welded, as shown in FIG. 7, the components 2, 3 were disposed so that their bent positions coincided with each other, and the length of the lapped portion 4 of the components was 10 mm.

The compositions of the fluxes, percentage filling of the fluxes and the compositions of the sheaths of the flux-cored wire for welding different materials of Examples and Comparative Examples used in this Example are shown in Table 1. A plate material shown in FIG. 6 and a bent plate material shown in FIG. 7 were lap-welded by using the flux-cored wires of these Examples and Comparative Examples. The tensile shear strength and peeling strength of the lap-welded weld 5 were determined.

(Evaluation of Tensile Shear Strength)

Tensile shear strength was evaluated by using the lap-welded plate material shown in FIG. 6.

The plate material after being welded was processed into a JIS No. 5 test piece defined by JIS Z 2201-1998. At this time, the weld 5 was adjusted to be the center of the parallel portion. The respective plate materials were pulled in the direction of the arrow in FIG. 6 by using a tensile tester (uniaxial tester RS-2 manufactured by Shimadzu Corporation) to determine the tensile shear strength of the weld 5. The tensile shear strengths of the welds 5 when the flux-cored wires of Examples and Comparative Examples were welded are shown in Table 1.

(Evaluation of Peeling Strength)

Peeling strength was evaluated by using a bent plate material after being lap-welded shown in FIG. 7.

The plate material after being welded was processed into a strip with a width of 25 mm. Each of the plate materials was pulled in the direction of the arrow in FIG. 7 by using a tensile tester (uniaxial tester RS-2 manufactured by Shimadzu Corporation) to determine the peeling strength of the weld 5. The peeling strengths of the welds 5 when welding was performed by using the flux-cored wires of Examples and Comparative Examples are also shown in Table 1.

The test pieces of Examples and Comparative Examples were evaluated based on the following scale: the case where the tensile shear strength was 200 MPa or higher and the peeling strength was 50 MPa or higher, A; the case where the tensile shear strength was 200 MPa or higher and the peeling strength was 40 MPa or higher but lower than 50 MPa, B; the case where the tensile shear strength was 200 MPa or higher and the peeling strength was 10 MPa or higher but lower than 40 MPa, C; and the case where the tensile shear strength was 200 MPa or higher and the peeling strength was lower than 10 MPa, D. Furthermore, evaluation was made on the following scale: the case where the tensile shear strength was lower than 200 MPa and the peeling strength was 15 MPa or higher, C; and the case where the tensile shear strength was lower than 200 MPa and the peeling strength was lower than 15 MPa, D.

TABLE 1

| | Flux component (% by mass) | | | | | | Sheath component (% by mass) | | | | Joint performance (MPa) | | Presence of boundary peeling | Evaluation |
|---|---|---|---|---|---|---|---|---|---|---|---|---|---|---|
| | Cesium Fluoride | Aluminum fluoride | Potassium fluoride | Potassium aluminum fluoride | Lanthanum fluoride | Percentage filling (% by mass) | Si | Mn | Mg | Fe | Tensile shear strength | Peeling strength | | |
| Example 1 | 30 | 70 | — | — | — | 10 | 1.0 | 0.01 | 0.01 | 0.10 | 210 | 49 | No | B |
| Example 2 | 30 | — | 70 | — | — | 10 | 1.0 | 0.01 | 0.01 | 0.10 | 209 | 47 | No | B |
| Example 3 | 30 | — | — | 70 | — | 10 | 1.0 | 0.01 | 0.01 | 0.10 | 217 | 46 | No | B |
| Example 4 | 30 | — | — | 60 | 10 | 10 | 1.0 | 0.01 | 0.01 | 0.10 | 222 | 46 | No | B |
| Example 5 | 30 | 10 | 10 | 50 | — | 10 | 1.0 | 0.01 | 0.01 | 0.10 | 212 | 42 | No | B |
| Example 6 | 30 | 10 | 10 | 50 | — | 5 | 1.0 | 0.01 | 0.01 | 0.10 | 219 | 43 | No | B |
| Example 7 | 30 | 10 | 10 | 50 | — | 20 | 1.0 | 0.01 | 0.01 | 0.10 | 221 | 50 | No | A |
| Example 8 | 30 | 10 | 10 | 50 | — | 10 | 1.4 | 0.01 | 0.01 | 0.10 | 224 | 51 | No | A |
| Example 9 | 30 | 10 | 10 | 50 | — | 10 | 0.8 | 0.01 | 0.01 | 0.10 | 220 | 55 | No | A |
| Example 10 | 30 | 10 | 10 | 50 | — | 10 | 1.9 | 0.01 | 0.01 | 0.10 | 208 | 55 | No | A |
| Example 11 | 20 | 10 | 10 | 60 | — | 10 | 1.0 | 0.01 | 0.01 | 0.10 | 210 | 46 | No | B |
| Example 12 | 60 | 5 | 5 | 30 | — | 10 | 1.0 | 0.01 | 0.01 | 0.10 | 210 | 46 | No | B |
| Comparative example 1 | 30 | 10 | 10 | 50 | — | 10 | 1.0 | 0.12 | 0.01 | 0.10 | 192 | 20 | Yes | C |
| Comparative example 2 | 30 | 10 | 10 | 50 | — | 10 | 1.0 | 0.01 | 0.30 | 0.10 | 198 | 20 | Yes | C |
| Comparative example 3 | 65 | 35 | — | — | — | 10 | 1.0 | 0.01 | 0.01 | 0.10 | 207 | 25 | Yes | C |
| Comparative example 4 | 15 | 65 | — | — | — | 10 | 1.0 | 0.01 | 0.01 | 0.10 | 198 | 15 | Yes | C |
| Comparative example 5 | 30 | 10 | 10 | 50 | — | 10 | 0.7 | 0.01 | 0.01 | 0.10 | 180 | 50 | No | C |
| Comparative example 6 | 30 | 10 | 10 | 50 | — | 10 | 2.0 | 0.01 | 0.01 | 0.10 | 223 | 15 | Yes | C |
| Comparative example 7 | 30 | 10 | 10 | 50 | — | 10 | 4.9 | 0.01 | 0.01 | 0.10 | 224 | 5 | Yes | D |
| Comparative example 8 | 30 | 10 | 10 | 50 | — | 10 | 13.1 | 0.01 | 0.01 | 0.10 | 223 | 2 | Yes | D |
| Comparative example 9 | 30 | 10 | 10 | 50 | — | 3 | 1.0 | 0.01 | 0.01 | 0.10 | 189 | 10 | Yes | D |
| Comparative example 10 | 30 | 10 | 10 | 50 | — | 25 | 1.0 | 0.01 | 0.01 | 0.10 | 200 | 15 | Yes | C |

As shown in Table 1, the amounts of cesium fluoride in the fluxes, the percentage filling of the fluxes, and the ratios of Si and Mn, Mg and Fe as impurities in the sheaths of Examples 1 to 12 fall within the range of the present invention. Therefore, Examples 1 to 12 had tensile shear strengths and peeling strengths higher than Comparative Examples 1 to 10 which do not meet the range of the present invention.

In addition, in Examples 1 to 12 which meet the range of the present invention, Example 10 had an amount of Si contained in the sheath above the range (0.8 to 1.4% by mass) of claim 2 of the present invention. Therefore, Example 10 had a slightly lower tensile shear strength than Examples 1 to 9, 11 and 12 which had the amounts of Si contained in the sheaths falling within the range of claim 2 of the present invention.

Second Example

Next, Examples of the method for MIG welding of different materials using the flux-cored wire for welding different materials of the present invention will be specifically described in comparison with their Comparative Examples. A plate material (for example, width: 100 mm, length: 300 mm) made of AA 6022 alloy (JIS A 6000 series alloy) with a plate thickness of 2.0 mm was used as the aluminum alloy material 2. In addition, a 980 MPa grade cold-rolled steel plate having a plate thickness of 1.4 mm (for example, width: 100 mm, length: 300 mm) was subjected to hot-dip galvanizing, giving the galvanized steel material 3. Sample materials to be welded were unprocessed plate materials of the aluminum alloy material 2 and the galvanized steel material 3, and bent plate materials which were bent 90 degrees in positions spaced from the edges of the respective plate materials by appropriate lengths (aluminum alloy material 2: 10 mm from the edge of the plate material, galvanized steel material 3: 60 mm from the edge of the plate material) were used.

These aluminum alloy material 2 and galvanized steel material 3 were then disposed to overlap with each other. As shown in FIG. 3, the aluminum alloy material 2 was disposed on the MIG torch 7 side, and the lapped portion 4 was surrounded by a shielding gas atmosphere. An argon gas was used as a shielding gas. The lapped portion 4 was then energized by using each of the flux-cored wires for welding different materials of Examples and Comparative Examples (diameter: 1.2 mm), performing lap MIG welding. A pulsed DC MIG welding power source (current: 90 A, voltage: 16 V) was used as a MIG welding machine for welding the lapped portion 4. The welding speed was 0.5 m/min.

When plate materials were used as components to be welded, they were disposed so that the length of the lapped portion 4 of the components was 50 mm as shown in FIG. 6. In addition, when bent plate materials were used as components to be welded, as shown in FIG. 7, the components 2, 3 were disposed so that their bent positions coincided with each other, and the length of the lapped portion 4 of the components was 10 mm The compositions in the fluxes, the percentage filling of the fluxes and the compositions in the sheaths of the flux-cored wires for welding different materials of Examples and Comparative Examples used in this Example are shown in Table 2 below. In Table 2, the amounts of Fe which is an impurity contained in the sheath were all 0.07% by mass. A plate material shown in FIG. 6 and a bent plate material shown in FIG. 7 were lap-welded by using the flux-cored wires of these Examples and Comparative Examples. The tensile shear strength and peeling strength of the lap-welded weld 5 were determined.

(Evaluation of Tensile Shear Strength)

Tensile shear strength was evaluated by using the lap-welded plate material shown in FIG. 6. The plate material after being welded was processed into a JIS No. 5 test piece defined by JIS Z 2201-1998. At this time, the weld 5 was adjusted to be the center of the parallel portion. Each of the plate materials was pulled in the direction of the arrow in FIG. 4 by using a tensile tester (uniaxial tester RS-2 manufactured by Shimadzu Corporation) to determine the tensile shear strength of the weld 5. The tensile shear strengths of the welds 5 when the flux-cored wires of Examples and Comparative Examples were welded are shown in Table 1.

(Evaluation of Peeling Strength)

Peeling strength was evaluated by using a bent plate material after being lap-welded shown in FIG. 7. The plate material after being welded was processed into a strip with a width of 25 mm. Each of the plate materials was pulled in the direction of the arrow in FIG. 7 by using a tensile tester (uniaxial tester RS-2 manufactured by Shimadzu Corporation) to determine the peeling strength of the weld 5. The peeling strengths of the welds 5 when welding was performed by using the flux-cored wires of Examples and Comparative Examples are also shown in Table 2.

The test pieces of Examples and Comparative Examples were evaluated based on the following scale: the case where the tensile shear strength was 160 MPa or higher and the peeling strength was 10 MPa or higher, A; the case where the tensile shear strength was 160 MPa or higher and the peeling strength was 7 MPa or higher but lower than 10 MPa, B; the case where the tensile shear strength was 160 MPa or higher and the peeling strength was lower than 7 MPa, or the peeling strength was 7 MPa or higher and the tensile shear strength was lower than 160 MPa, C; and the case where the tensile shear strength was lower than 160 MPa and the peeling strength was lower than 7 MPa, D. Numerical values are different in these evaluation methods from those in the case of laser welding. This results from a difference in the plate thickness of the evaluated aluminum materials (laser welding: 1 mm, MIG welding: 2 mm). In addition, especially in the case of peeling strength, the plastic deformation resistance during the tensile test and the method of tensile test are different. Therefore, the values are low in MIG welding.

TABLE 2

| | Flux component (% by mass) | | | | | Percentage filling (% by mass) | Sheath component (% by mass) | | | Joint performance | | | |
|---|---|---|---|---|---|---|---|---|---|---|---|---|---|
| | | | | | | | | | | (MPa) | | Presence of boundary peeling | Evaluation |
| | Cesium Fluoride | Aluminum fluoride | Potassium fluoride | Potassium aluminum fluoride | Lanthanum fluoride | | Si | Mn | Mg | Tensile shear strength | Peeling strength | | |
| Example 1 | 30 | 70 | — | — | — | 10 | 1.0 | 0.01 | 0.01 | 167 | 9.8 | No | B |
| Example 2 | 30 | — | 70 | — | — | 10 | 1.0 | 0.01 | 0.01 | 161 | 8.8 | No | B |

TABLE 2-continued

| | Flux component (% by mass) | | | | | Percentage filling (% by mass) | Sheath component (% by mass) | | | Joint performance (MPa) | | Presence of boundary peeling | Evaluation |
|---|---|---|---|---|---|---|---|---|---|---|---|---|---|
| | Cesium Fluoride | Aluminum fluoride | Potassium fluoride | Potassium aluminum fluoride | Lanthanum fluoride | | Si | Mn | Mg | Tensile shear strength | Peeling strength | | |
| Example 3 | 30 | — | — | 70 | — | 10 | 1.0 | 0.01 | 0.01 | 168 | 8.5 | No | B |
| Example 4 | 30 | — | — | 60 | 10 | 10 | 1.0 | 0.01 | 0.01 | 170 | 8.6 | No | B |
| Example 5 | 30 | 10 | 10 | 50 | — | 10 | 1.0 | 0.01 | 0.01 | 163 | 8.1 | No | B |
| Example 6 | 30 | 10 | 10 | 50 | — | 5 | 1.0 | 0.01 | 0.01 | 172 | 7.9 | No | B |
| Example 7 | 30 | 10 | 10 | 50 | — | 20 | 1.0 | 0.01 | 0.01 | 176 | 10.0 | No | A |
| Example 8 | 30 | 10 | 10 | 50 | — | 10 | 1.4 | 0.01 | 0.01 | 172 | 11.0 | No | A |
| Example 9 | 30 | 10 | 10 | 50 | — | 10 | 0.8 | 0.01 | 0.01 | 174 | 10.1 | No | A |
| Example 10 | 30 | 10 | 10 | 50 | — | 10 | 1.9 | 0.01 | 0.01 | 165 | 9.8 | No | B |
| Example 11 | 20 | 10 | 10 | 50 | — | 10 | 1.0 | 0.01 | 0.01 | 162 | 8.9 | No | B |
| Example 12 | 60 | 5 | 5 | 30 | — | 10 | 1.0 | 0.01 | 0.01 | 160 | 8.7 | No | B |
| Comparative example 1 | 30 | 10 | 10 | 50 | — | 10 | 1.0 | 0.10 | 0.01 | 162 | 5.4 | Yes | C |
| Comparative example 2 | 30 | 10 | 10 | 50 | — | 10 | 1.0 | 0.01 | 0.30 | 155 | 4.9 | Yes | D |
| Comparative example 3 | 65 | 35 | — | — | — | 10 | 1.0 | 0.01 | 0.01 | 168 | 5.2 | Yes | C |
| Comparative example 4 | 15 | 65 | — | 20 | — | 10 | 1.0 | 0.01 | 0.01 | 159 | 2.5 | Yes | D |
| Comparative example 5 | 30 | 10 | 10 | 50 | — | 10 | 0.7 | 0.01 | 0.01 | 157 | 10.2 | No | C |
| Comparative example 6 | 30 | 10 | 10 | 50 | — | 10 | 2.0 | 0.01 | 0.01 | 155 | 2.9 | Yes | D |
| Comparative example 7 | 30 | 10 | 10 | 50 | — | 10 | 4.9 | 0.01 | 0.01 | 148 | 2.5 | Yes | D |
| Comparative example 8 | 30 | 10 | 10 | 50 | — | 10 | 13.1 | 0.01 | 0.01 | 149 | 1.2 | Yes | D |
| Comparative example 9 | 30 | 10 | 10 | 50 | — | 3 | 1.0 | 0.01 | 0.01 | 148 | 1.1 | Yes | D |
| Comparative example 10 | 30 | 10 | 10 | 50 | — | 25 | 1.0 | 0.01 | 0.01 | 162 | 2.0 | Yes | C |

As shown in this Table 2, the amounts of cesium fluoride in the fluxes, the percentage filling of the fluxes, and the ratios of Si and Mn, Mg and Fe as impurities in the sheath of Examples 1 to 12 fall within the range of the present invention. Therefore, Examples 1 to 12 had tensile shear strengths and peeling strengths higher than those of Comparative Examples 1 to 10 which do not meet the range of the present invention. In addition, no boundary peeling occurred in the peeling strength test of Examples 1 to 12 of the present invention, but all Comparative Examples other than Comparative Example 5 suffered boundary peeling.

EXPLANATION OF REFERENCES

1 Flux-cored wire for welding different materials
1a Sheath
1b Flux
2 Aluminum alloy material
3 Galvanized steel material
4 Lapped portion
5 Weld
6 Abutment portion
7 Torch

The invention claimed is:

1. A flux-cored wire, comprising:
a cylindrical aluminum alloy sheath comprising aluminum and, by mass % based on a total mass of the sheath,
Si: 0.8 to 1.9%,
Mn: 0 to 0.1%,
Mg: 0 to 0.1%,
Fe: 0 to 0.1%; and
a flux inside the sheath comprising cesium fluoride in an amount of 20 to 60% by mass,
wherein a percentage of the flux inside the sheath is 5 to 20% by mass, based on a total mass of the wire.

2. The flux-cored wire of claim 1, wherein an amount of Si in the sheath is 0.8 to 1.4% by mass.

3. A method for laser welding different materials, the method comprising:
contacting aluminum or an aluminum alloy material and a galvanized steel material, to form a joint portion; and
irradiating the joint portion with laser light while feeding the flux-cored wire of claim 1 to the joint portion, to bond the aluminum or aluminum alloy material and the galvanized steel material.

4. The method of claim 3, wherein the aluminum or aluminum alloy material and the galvanized steel material are disposed to overlap each other with the aluminum or aluminum alloy material being on a laser light side, and the aluminum or aluminum alloy material and the galvanized steel material are lap-welded.

5. The method of claim 3, wherein the aluminum or aluminum alloy material and the galvanized steel material abut, and
the aluminum or aluminum alloy material and the galvanized steel material are butt-welded with a feeding position of the flux-cored wire and an irradiation position of the laser light shifted closer to an aluminum or aluminum alloy material side than to an abutment portion.

6. A method for MIG welding different materials, the method comprising:
contacting aluminum or an aluminum alloy material and a galvanized steel material, to form a joint portion; and forming an arc between the joint portion and the flux-cored wire of claim 1 and bonding the aluminum or aluminum alloy material and the galvanized steel material while feeding an inert gas to a vicinity around the arc.

7. The method of claim 6, wherein the aluminum or aluminum alloy material and the galvanized steel material are disposed to overlap each other with the aluminum or aluminum alloy material being on a side of the flux-cored wire, and the aluminum or aluminum alloy material and the galvanized steel material are lap-welded.

8. The method of claim 6, wherein the aluminum or aluminum alloy material and the galvanized steel material abut, and the aluminum or aluminum alloy material and the galvanized steel material are butt-welded with a feeding position of the flux-cored wire shifted closer to an aluminum or aluminum alloy material side than to an abutment portion.

9. The flux-core wire of claim 1, wherein the wire is suitable for welding aluminum or an aluminum alloy material and a galvanized steel material.

10. A method for laser welding different materials, the method comprising:

contacting aluminum or an aluminum alloy material and a galvanized steel material, to form a joint portion; and irradiating the joint portion with laser light while feeding the flux-cored wire of claim 2 to the joint portion, to bond the aluminum or aluminum alloy material and the galvanized steel material.

11. The method of claim 10, wherein the aluminum or aluminum alloy material and the galvanized steel material are disposed to overlap each other with the aluminum or aluminum alloy material being on a laser light side, and the aluminum or aluminum alloy material and the galvanized steel material are lap-welded.

12. The method of claim 10, wherein the aluminum or aluminum alloy material and the galvanized steel material abut, and the aluminum or aluminum alloy material and the galvanized steel material are butt-welded with a feeding position of the flux-cored wire and an irradiation position of the laser light shifted closer to an aluminum or aluminum alloy material side than to an abutment portion.

13. A method for MIG welding different materials, the method comprising:

contacting aluminum or an aluminum alloy material and a galvanized steel material, to form a joint portion; and forming an arc between the joint portion and the flux-cored wire of claim 2 and bonding the aluminum or aluminum alloy material and the galvanized steel material while feeding an inert gas to a vicinity around the arc.

14. The method of claim 13, wherein the aluminum or aluminum alloy material and the galvanized steel material are disposed to overlap each other with the aluminum or aluminum alloy material being on a side of the flux-cored wire, and the aluminum or aluminum alloy material and the galvanized steel material are lap-welded.

15. The method of claim 13, wherein the aluminum or aluminum alloy material and the galvanized steel material abut, and the aluminum or aluminum alloy material and the galvanized steel material are butt-welded with a feeding position of the flux-cored wire shifted closer to an aluminum or aluminum alloy material side than to an abutment portion.

16. The method of claim 1, wherein a content of Mn in the sheath is in a range of 0.01 to 0.1 mass %, a content of Mg in the sheath is 0.01 to 0.1 mass %, and a content of Fe in the sheath is 0.07 to 0.1 mass %, based on a total mass of the sheath.

17. A flux-cored wire, consisting essentially of:

a cylindrical aluminum alloy sheath comprising aluminum and, by mass % based on a total mass of the sheath, Si: 0.8 to 1.9%, Mn: 0 to 0.1%, Mg: 0 to 0.1%, Fe: 0 to 0.1%; and a flux inside the sheath comprising cesium fluoride in an amount of 20 to 60% by mass, with the remainder of the flux inside the sheath comprising at least one fluoride selected from the group consisting of aluminum fluoride, potassium fluoride, potassium aluminum fluoride, and lanthanum fluoride; and, wherein a percentage of the flux inside the sheath is 5 to 20% by mass, based on a total mass of the wire.

18. The flux-cored wire of claim 1, wherein the flux inside the sheath comprises cesium fluoride in an amount of 20 to 30% by mass.

19. The flux-cored wire of claim 17, wherein the flux inside the sheath comprises cesium fluoride in an amount of 20 to 30% by mass.

20. The flux-cored wire of claim 1, wherein the flux inside the sheath comprises cesium fluoride in an amount of 20 to 60% by mass and potassium aluminum fluoride in an amount of 70 to 30% by mass.

* * * * *